(12) United States Patent
Han et al.

(10) Patent No.: US 7,619,674 B2
(45) Date of Patent: Nov. 17, 2009

(54) CMOS IMAGE SENSOR WITH WIDE DYNAMIC RANGE

(75) Inventors: Sang-Wook Han, Seoul (KR); Euisik Yoon, Plymouth, MN (US)

(73) Assignee: Korea Advanced Institute of Science and Technology, Daejeon (KR)

( * ) Notice: Subject to any disclaimer, the term of this patent is extended or adjusted under 35 U.S.C. 154(b) by 597 days.

(21) Appl. No.: 11/337,530

(22) Filed: Jan. 24, 2006

(65) Prior Publication Data
US 2006/0181625 A1    Aug. 17, 2006

(30) Foreign Application Priority Data
Jan. 24, 2005    (KR) ..................... 10-2005-0006433

(51) Int. Cl.
*H04N 5/335* (2006.01)
(52) U.S. Cl. ................... 348/308; 348/294; 348/297; 348/281; 250/208.1
(58) Field of Classification Search ............ 348/302, 348/312, 294, 297, 281; 250/208.1
See application file for complete search history.

(56) References Cited

U.S. PATENT DOCUMENTS

| | | | | |
|---|---|---|---|---|
| 5,365,269 A | * | 11/1994 | Holmes et al. | 348/297 |
| 6,798,451 B1 | * | 9/2004 | Suzuki et al. | 348/294 |
| 6,927,796 B2 | * | 8/2005 | Liu et al. | 348/297 |
| 6,987,536 B2 | * | 1/2006 | Olding et al. | 348/297 |
| 7,009,227 B2 | * | 3/2006 | Patrick et al. | 257/233 |
| 7,446,812 B2 | * | 11/2008 | Ando et al. | 348/362 |
| 2004/0252199 A1 | * | 12/2004 | Cheung et al. | 348/208.4 |
| 2005/0078205 A1 | * | 4/2005 | Hynecek | 348/294 |
| 2005/0151866 A1 | * | 7/2005 | Ando et al. | 348/297 |
| 2006/0011810 A1 | * | 1/2006 | Ando et al. | 250/208.1 |

* cited by examiner

*Primary Examiner*—Sinh Tran
*Assistant Examiner*—Quang V Le
(74) *Attorney, Agent, or Firm*—Venable LLP; Michael A. Sartori; Steven J. Schwarz

(57) ABSTRACT

The present invention provides a CMOS image sensor for broadening a dynamic range by controlling an integration time for each pixel to thereby obtain a high quality image with a low noise. The CMOS image sensor according to the present invention includes plural pixels, each for storing an integration time of a present frame, and control means for controlling the integration time of a next frame based on the stored integration time.

18 Claims, 4 Drawing Sheets

CMOS IMAGE SENSOR WITH WIDE DYNAMIC RANGE

FIELD OF INVENTION

The present invention relates to an image sensor; and, more particularly, to a unit pixel with a wide dynamic range and a complementary metal oxide semiconductor (CMOS) image sensor having the same.

DESCRIPTION OF PRIOR ART

Recently, a complementary metal oxide semiconductor (CMOS) image sensor is generally used in a mobile phone, a camera in use for a personal computer, and other electronic devices. As compared with a charge coupled device CCD having widely used in electronic devices, a CMOS image senor is more simply operated. Also, the CMOS image sensor can be integrated with a signal processing circuit in one chip such, thus it is possible to implement a system on chip (SOC). Accordingly, a module having the CMOS image sensor can be miniaturized.

Further, since it is possible to apply a conventional CMOS technology which has been used for fabricating any electronic device to fabricating the CMOS image sensor, a fabrication cost of the CMOS image sensor can be reduced. This technical compatibility between methods for fabricating the CMOS image sensor and other CMOS circuit produces plural advantages.

A conventional CMOS image sensor reaches to limits of capturing various objects having wide-range brightness in one picture, because of a dynamic range being approximately 60 dB. In addition, as it is required to produce a CMOS image sensor operating under a low power condition based on the conventional CMOS technology, a lower voltage becomes used and, as a result, it is more difficult to obtain a enough wide dynamic range.

Herein, a dynamic range is one of major factors determining an image quality. Accordingly, plural methods for boarding the dynamic range is suggested steady.

As a representative method, a method for reconstructing a target image by using multiple images obtained during a predetermined time is suggested by El Gamal of Stanford University, entitled "A 640×480 CMOS Image Sensor with Ultrawide Dynamic Range Floating-Point Pixel-Level ADC" in IEEE Journal of Solid State Circuits, Vol. 34, No. 12, published December 1999.

In detail, an image sensor according to El Gamal receives multiple images which are respectively captured in different integration time and, then, reconstructs one wide dynamic range image that is constituted with the pixel output having the longest integration time among non-saturated pixel outputs in a current image. Above described method can effectively increase a dynamic range of bright area in an image. However, for obtaining the target image, the image sensor should get multiple images; and, since the multiple images are captured very rapidly for taking real-time images, the image sensor should consume large power.

In addition, although a digital pixel is suggested for capturing the multiple images very rapidly, the digital pixel requires more transistors and has larger or bigger noise as compared with a conventional pixel having 3 or 4 transistors. As a result, a size of the digital pixel is increased and a dynamic range of dark area in a captured image is decreased.

Another method for recognizing a integration time until a voltage level of a photodiode in each pixel is dropped to a predetermined voltage level is suggested by David Stoppa et al., entitled "Novel CMOS Image Sensor with a 132 dB Dynamic Range" in IEEE Journal of Solid State Circuits, Vol. 37, No. 12, published December 2002. Although David Stoppa et al. increase a dynamic range to 132 dB, it is difficult to achieve an image sensor with a high resolution because a size of each pixel, which should include a comparing unit and an analog memory, is very large.

Moreover, another method for adjusting an integration time in each pixel to increase a dynamic range is suggested. This method broadens the dynamic range by controlling an integration time of each pixel in the image sensor, not simultaneously adjusting an integration time of the whole pixels electronically or mechanically.

An integration time about the first pixel receiving bright light becomes relatively short; and an integration time about the second pixel where a dark light is inputted grows longer in order to receive a sufficient amount of inputted light without a saturation. A method similar to above described method is suggested by P. M. Acosta-Serafini, I. Masaki and C. G. Sodini in Massachusetts Institute of Technology (MIT), entitled "A sampling algorithm with overlapping integration intervals" in IEEE Journal of Solid-State Circuits, Vol. 39, pp. 1487-1496, published September 2004. Further, another method similar to above described method is suggested by Yadid-Pecht et al., entitled "In-Pixel Auto-exposure CMOS APS" in IEEE Journal of Solid State Circuits, Vol. 38, No. 8, published August 2003.

FIG. 1 is a block diagram showing a conventional image sensor with a pixel level integration time control technique for a wide dynamic range.

As shown, the conventional image sensor includes a pixel array 10, a signal process unit 12, a controller 11, and a frame memory 13. Herein, the pixel array 10 has N×M number of unit pixels, wherein the N and M are positive integers.

The pixel array 10 includes plural unit pixels, each for maximizing reactivity in response to a light; and the controller 11 controls overall operation of the conventional image sensor and interfaces an external system. Also, the controller 11 which is implemented in column parallel manner adjusts an integration time for each pixel in a basis of column by column.

The signal process unit 12 is for processing a data signal transmitted from the pixel array 10. Herein, the signal process unit 12 may perform not only an analog operation but also a digital operation including an analog to digital conversion.

Similar to the pixel array 10, the frame memory 13 controlled by a row addressing stores an integration time for each pixel outputted from the controller 11.

In the conventional CMOS image sensor having above mentioned structure, it is effective to broaden a dynamic range of unit pixels corresponding to a blight light. However, since an area occupied by a frame memory for storing an integration time is larger than that occupied by plural unit pixels in a real implementation for a CMOS image sensor, there is a disadvantage about a cost and a yield for fabricating the CMOS image sensor.

In addition, because a true correlated double sampling (CDS) for effectively removing a random reset noise cannot be applied to above described conventional CMOS image sensor, it is difficult to obtain a high quality image and broaden a dynamic range of unit pixels corresponding to a dark light.

SUMMARY OF INVENTION

It is, therefore, an object of the present invention to provide a CMOS image sensor for broadening a dynamic range by controlling an integration time for each pixel without a huge frame memory.

It is, therefore, another object of the present invention to provide a CMOS image sensor for broadening a dynamic range by controlling an integration time and simultaneously decreasing a random reset noise by applying a true CDS operation for each pixel to thereby obtain a high quality image with a low noise.

It is, therefore, another object of the present invention to provide a CMOS image sensor having plural unit pixels for sharing a transistor to thereby increase an integration of the CMOS image sensor.

In accordance with an aspect of the present invention, there is provided an apparatus for converting a real image into an electric signal, including plural pixels, each for storing an integration time of a present frame, and control means for controlling the integration time of a next frame based on the stored integration time.

In accordance with another aspect of the present invention, there is provided an image sensor for converting a real image into an electric signal, including a pixel array block including plural unit pixels, each for storing an integration time of a present frame, wherein the plural unit pixels is arranged in a form of N by M matrix, N and M being positive integers; and a control block having plural column controllers, each for controlling the integration time of a next frame based on the stored integration time in a basis of column by column.

In accordance with another aspect of the present invention, there is provided a method for converting a real image into an electric signal, comprising the steps of storing integration times of a present frame to unit pixels respectively, wherein the unit pixels are arranged in a form of N by M matrix, N and M being positive integers; and controlling the integration time of a next frame based on the stored integration time for each pixel in a basis of column by column.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF INVENTION

Hereinafter, a CMOS image sensor with a wide dynamic range according to the present invention will be described in detail referring to the accompanying drawings.

Figure 2:
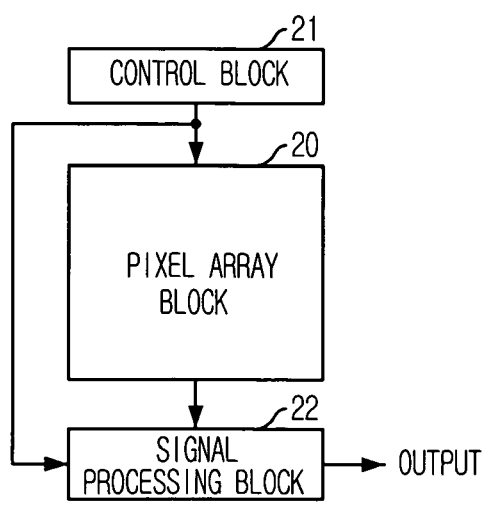
FIG. 2 is a block diagram showing an image sensor in accordance with an embodiment of the present invention.

FIG. 2 is a block diagram showing an image sensor in accordance with an embodiment of the present invention.

As shown, the image sensor includes a pixel array block 20, a control block 21, and a signal processing block 22. Herein, the pixel array 10 has N×M number of unit pixels, wherein the N and M are positive integers.

The pixel array block 20 includes plural unit pixels, which is arranged in form of a row N by column M, each for maximizing reactivity in response to a light. The pixel array block 20 is an important region of detecting an image based on information inputted from an environment.

The control block 21 controls overall operations of the conventional image sensor and interfaces an external system. Also, the control block 21 includes: a register for storing a programmed data about various operations of the conventional image sensor to thereby perform a programmed operation; and a unit controller for adjusting an integration time for each unit pixel in a basis of column by column.

The signal processing unit 22 is for processing a data signal transmitted from the pixel array block 20. Herein, the signal process unit 22 may perform not only an analog operation but also a digital operation including an analog to digital conversion. For example, as the digital operation, there are a color interpolation, a color correction, a gamma correction, an auto white balance, and an auto exposure.

Figure 1:
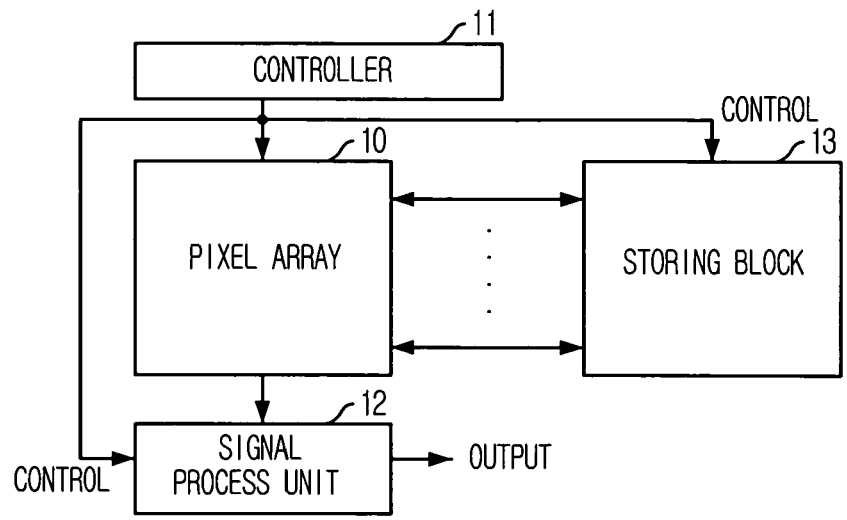
FIG. 1 is a block diagram showing a conventional image sensor with a pixel level integration time control technique for a wide dynamic range.

In the conventional pixel level integration time control CMOS image sensor as shown in FIG. 1, an additional frame memory controlled by a row addressing should be included in other region outside of the pixel array block 20, for storing an integration time for each unit pixel outputted from the controller 21.

However, in the present invention, the integration time for each unit pixel is stored in an analog memory included in the pixel array block 20. That is, each unit pixel included in the pixel array block 20 has a storing unit for storing the integration time for each unit pixel, instead of the additional storing block.

Herein, since the storing unit included in each unit pixel can be implemented by a parasitic capacitor at a sensing node of each unit pixel, each unit pixel is fabricated as a smaller size without deteriorating a fill factor. The sensing node means a node coupled to a source of a reset transistor and a gate of drive transistor in a conventional unit pixel having four transistors.

Figure 3:
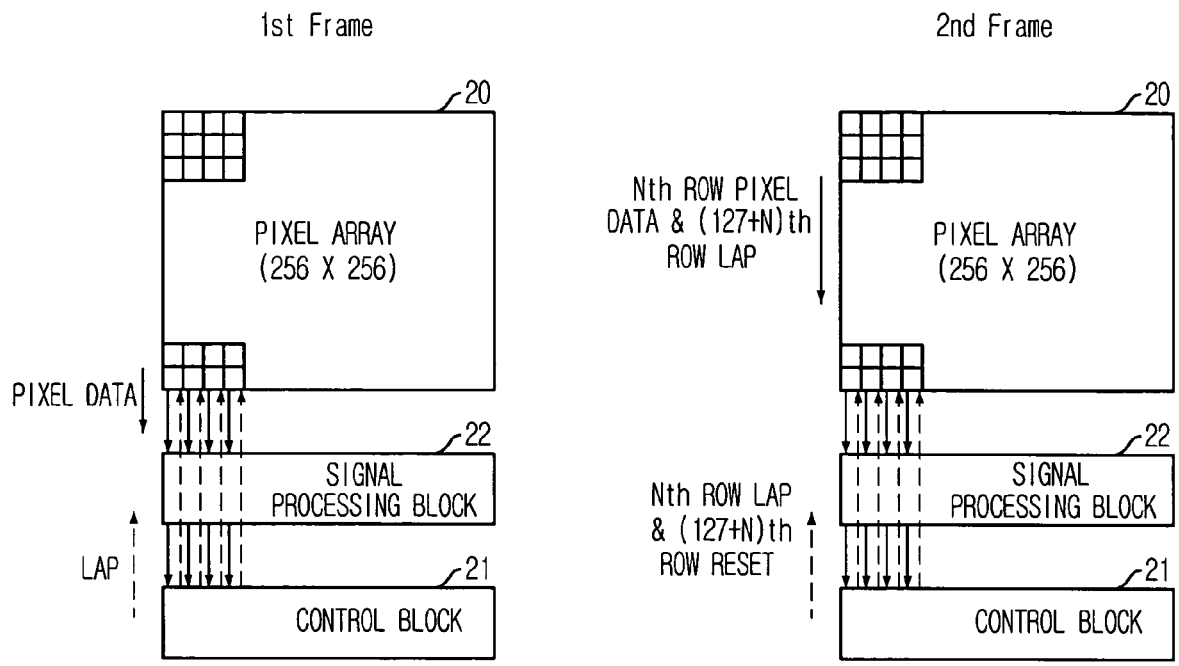
FIG. 3 is a block diagram illustrating an operation of the image sensor shown in FIG. 2.

FIG. 3 is a block diagram illustrating an operation of the image sensor shown in FIG. 2.

It is assumed that the pixel array block is formed in a 256×256 size and an integration time for a frame is 100 msec.

Based on a value of a first frame where each pixel receives a light corresponding to inputted image, each column controller corresponding to each column line in the pixel array block 20 determines a proper integration time of each pixel. Then, each column controller stores the proper integration time of each pixel to an analog memory of each corresponding pixel.

When an image corresponding to a first row line of a second frame is read out, each integration time stored in pixels corresponding to $128^{th}$ row line is simultaneously read out in a basis of column by column. Then, if the integration time stored in the pixel is about 50 msec, the pixel is reset to remove all accumulated data; otherwise, if the integration time stored in the pixel is about 100 msec, the pixel accumulates continuously, not is reset.

Likewise, when an image corresponding to a second row line is read out, each integration time stored in pixels corresponding to $(128+1)^{th}$ row line is simultaneously read out in a basis of column by column. Then, if the integration time stored in the pixel is about 50 msec, the pixel is reset to remove all accumulated data; otherwise, the pixel accumulates continuously, not is reset After performing above described method to $256^{th}$ row line, a pixel which is not reset in response to a proper integration time, which is already stored based on an image outputted from the first frame, has a 100 msec integration time. Also, a pixel which is reset has a 50 msec integration time.

A proper integration time required at a third frame is stored in the analog memory of each unit pixel by the column controller when an image is outputted from the second frame. That is, a proper integration time for a present frame is determined based on an image outputted from a prior frame.

In above described method, while data of unit pixels corresponding to a predetermined row line is outputted, it is controlled whether or not a unit pixel corresponding to another predetermined row line is reset; as a result, all pixels included in the image sensor have two kinds of integration time.

Based on a modification of above described method, if it is controlled whether or not a unit pixel corresponding to each of N number of row lines is reset while data of unit pixels corresponding to another row line is outputted, all pixels included in an image sensor can have N+1 kinds of integration time. Herein, N is a positive integer.

Generally, though a horizontal blanking period is very short such as a few μsec, a period for outputting a data of each unit pixel by a column addressing is relatively long. Herein, the horizontal blanking period means a time for transmitting a signal from a unit pixel to a signal processing block. Thus, while each data of unit pixels corresponding to a row line is outputted by column addressing, it can be controlled whether or not a unit pixel corresponding to each of N number of row lines is reset in response to a predetermined condition.

Figure 4:
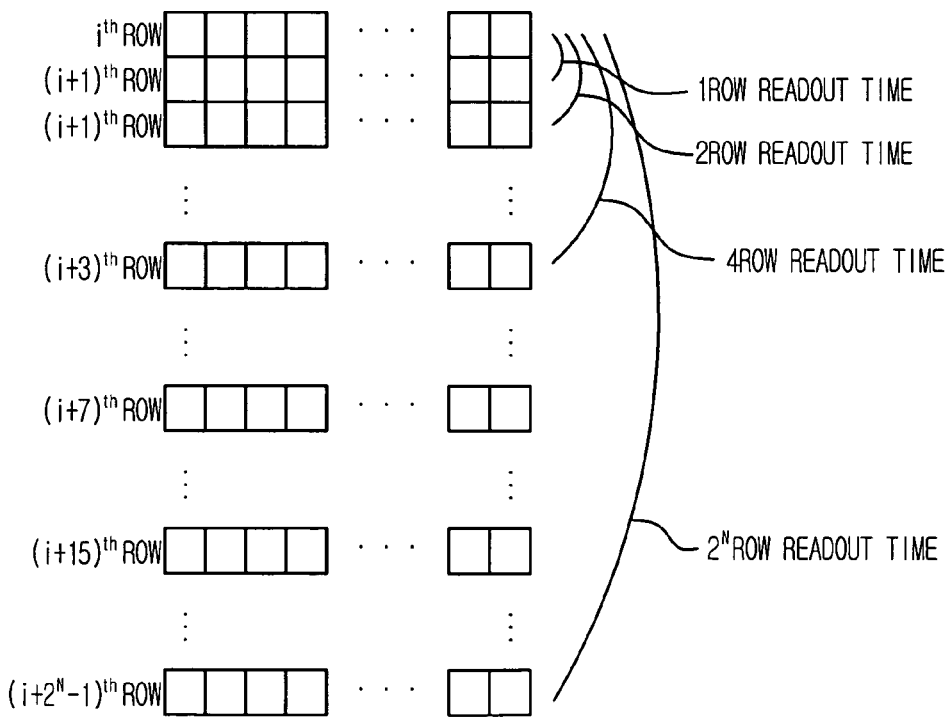
FIG. 4 is a diagram showing a conditional reset operation of the image sensor when data corresponding to a predetermined row line are outputted.

FIG. 4 is a diagram showing a conditional reset operation of the image sensor when data corresponding to a predetermined row line are outputted.

As shown, if the conditional reset operation is performed to $2^N$ number of row lines instead of N number of row lines, a maximum of an integration time is larger or equal to $2^N$ times than a minimum of an integration time. Namely, a dynamic range of a bright area can be increased by $2^N$ times.

Figure 5:
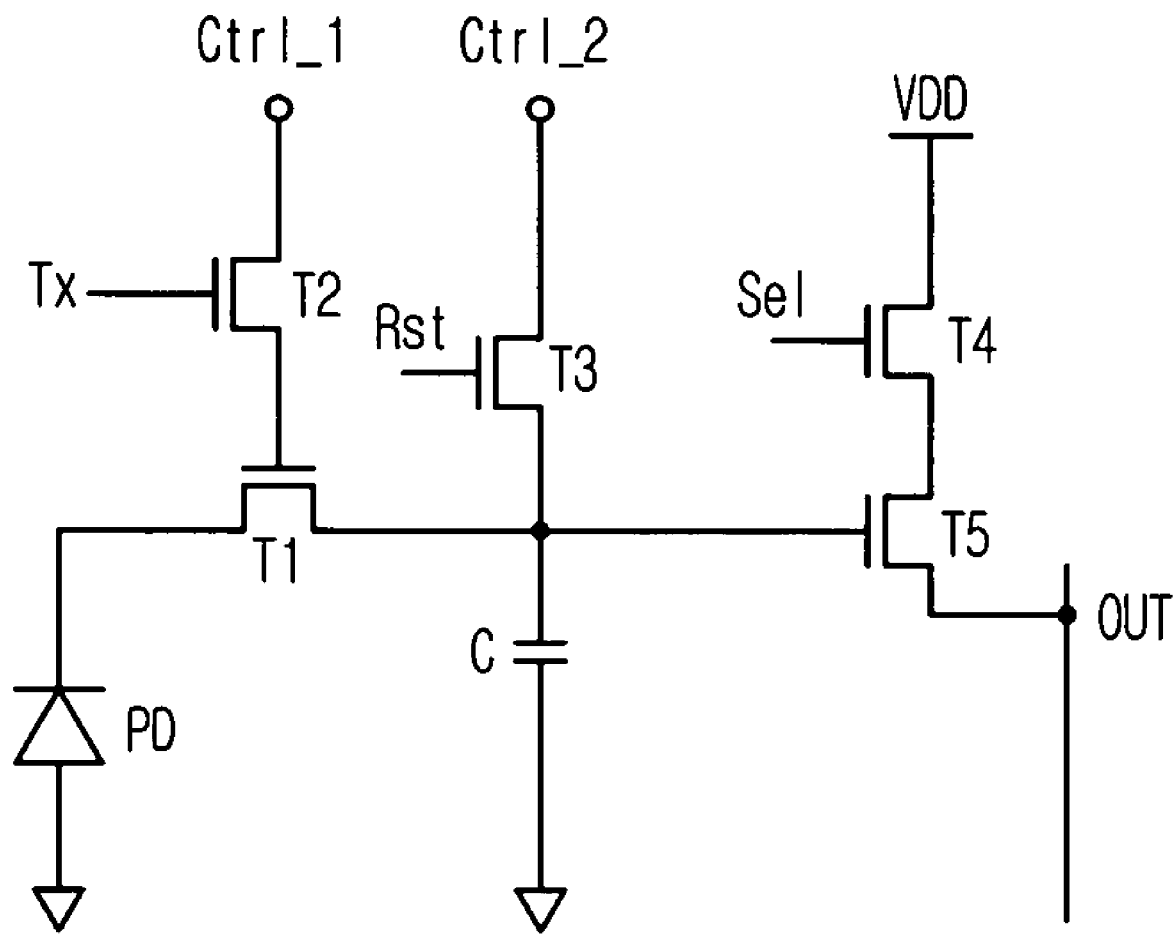
FIG. 5 is a schematic circuit diagram describing a unit pixel included in an image sensor in accordance with another embodiment of the present invention.

FIG. 5 is a schematic circuit diagram describing a unit pixel included in an image sensor in accordance with another embodiment of the present invention.

As shown, the unit pixel in the image sensor according to the present invention includes a photodiode PD, a transfer transistor T1, a control transistor T2, an analog memory, a reset transistor T3, a drive transistor T5, and a select transistor T4. Herein, a junction capacitor C is served as the analog memory.

The photodiode PD, having one of a PNP junction structure, a PNPN junction structure, etc, receives a light of a real image to generate a photo charge, i.e., an electron-hole pair corresponding to the light. The transfer transistor T1 transferring the photo charge accumulated in the photodiode PD to the junction capacitor C during a period for outputting an electric signal. For controlling the transfer transistor, the control transistor T2 having a gate for receiving a transfer signal Tx is coupled between a first control signal Ctrl_1 and a gate of the transfer transistor.

The junction capacitor C receives the photo charge transferred from the photodiode PD throughout the transfer transistor T1 when the transfer transistor T1 is turned on. Before receiving the photo charge, the junction capacitor C is used as the analog memory for storing an integration time. For resetting the junction capacitor C or storing the integration time to the junction capacitor C, the reset transistor T3, having a gate for receiving a reset signal Rst, is coupled between a second control signal Ctrl_2 and the junction capacitor C.

The drive transistor T5 is turned on in response to a charge amount transferred from the junction capacitor C to thereby output an electric signal corresponding to the charge amount. The select transistor T4, coupled between the drive transistor T5 and a power source voltage VDD, is controlled by a select signal Sel for selectively outputting the electric signal outputted from the drive transistor T5.

As shown in FIG. 5, the unit pixel in CMOS image sensor includes five transistors T1 to T5 and one photodiode PD. Though a conventional unit pixel generally includes four transistors, the unit pixel according to the present invention further includes a control transistor T2 coupled to the first control signal Ctrl_1 which is used for controlling plural unit pixels in a basis of column by column.

The transfer transistor T1 performs a transmission of photo charge accumulated in the photodiode PD into the junction capacitor C, wherein the junction capacitor C is used as a sensing node at this time. Then, the drive transistor T5 outputs a signal corresponding to a voltage level of the sensing node, i.e., the junction capacitor. The select transistor T4 is served as a switch for selecting a row line in response to the select signal Sel.

The reset transistor T3 is similar to a reset transistor included in a conventional unit pixel having four transistors; however, it is different that the reset transistor T3 is coupled to the second control signal Ctrl_2 outputted from the control block 21, not a power source voltage VDD.

The junction capacitor C coupled to a gate of the drive transistor T5 is used as the analog memory before photo charge accumulated in the photodiode PD is transmitted through the transfer transistor T1. Herein, the junction capacitor C according to an embodiment of the present invention can be implemented by a parasitic capacitor of the sensing node, not a general capacitor. In other words, there can be no additional device in a pixel array in order to implement an analog memory.

Plural column controllers arraigned every column calculate a proper integration time respectively and stores the proper integration time into the junction capacitor C throughout the reset transistor T3.

At the timing of determining whether or not unit pixels corresponding to a predetermined row line are reset, the stored integration time is delivered into the column controller via the drive transistor T5. If the reset for a predetermined unit pixel are required, the transfer transistor T1, the reset transistor T3 and the control transistor T2 reset the photodiode and junction capacitor C through the first and second control signals Ctrl_1 and Ctrl_2; otherwise, if the reset is not required, the photodiode continuously accumulates the photo charge.

When an image data is obtained by reading unit pixels corresponding to a predetermined row line, the image sensor according to the present invention performs a CDS method similar to that applying to the conventional image sensor having four transistors. In other words, a true CDS can be applied. Hereinafter, the CDS method applied to the image sensor according to the present invention is described in detail.

Before the reset level of the pixel is read, the stored information of analog memory is read first. The voltage level at the sensing node is provided to a gate of the drive transistor T5. Then, the select signal Sel is inputted to turn on the select transistor T4. After the select transistor T4 is turned on, the drive transistor T5 operated as a source follower outputs the first information stored in the analog memory, i.e., an integration time, into an output node OUT.

While the photodiode PD accumulates a photo charge, the second control signal Ctrl_2 becomes a voltage level of a power source voltage VDD and the junction capacitor, i.e., the sensing node, is reset to a voltage level of the power source voltage VDD-$V_{th}$ in response to a reset signal Rst supplied to the reset transistor T3. An alternation of the voltage level at the sensing node causes a variation of an input to a gate of the drive transistor T5. Then, the select signal Sel is inputted to turn on the select transistor T4. After the select transistor T4 is turned on, the drive transistor T5 operated as a source follower outputs a reset voltage level.

After a predetermined time, the transfer transistor T1 is turned on and, as a result, the photo charge accumulated by the photodiode PD is delivered into the junction capacitor C. Likewise, an alternation of the voltage level at the sensing node causes a variation of an input to a gate of the drive transistor T5. Then, the select signal Sel is inputted to turn on the select transistor T4. After the select transistor T4 is turned on, the drive transistor T5 outputs an electric signal corresponding to the photo charge to an output node OUT.

After then, an image data outputted from the unit pixel is finally outputted after determined based on a difference between the first reset voltage and the electric signal.

Since the true CDS method according to the present invention effectively reduces not only a fixed pattern noise but also a random reset noise, a dynamic range of a dark area in an image can be broaden and a high quality image can be obtained.

After the image is obtained, the reset signal Rst is activated to provide a second control signal Ctrl_2 having a voltage level corresponding to a proper integration time for next frame to each unit pixel. The junction capacitor C of each unit pixel is served as the analog memory again for storing the integration time of each unit pixel.

For increasing an integration of the image sensor according to the present invention, a predetermined unit pixel can share a transistor with a neighbor unit pixel.

Figure 6:
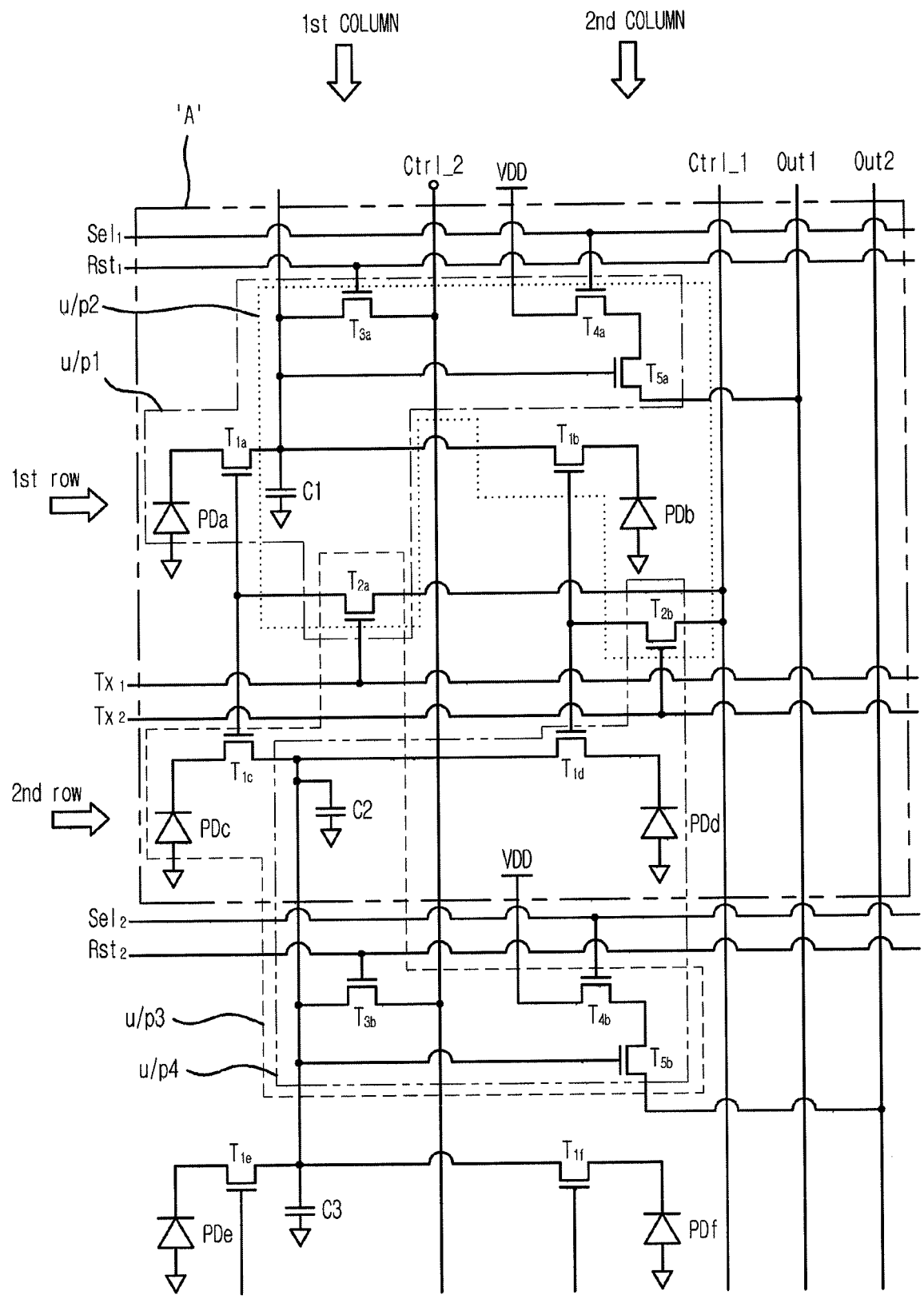
FIG. 6 is a schematic circuit diagram depicting 2×2 unit pixels included in an image sensor in accordance with another embodiment of the present invention.

FIG. 6 is a schematic circuit diagram depicting 2×2 unit pixels included in an image sensor in accordance with another embodiment of the present invention.

As shown, there are four unit pixels u/p1 to u/p4 having four photodiodes PDa to PDd and nine transistors $T_{1a}$, $T_{1b}$, $T_{1c}$, $T_{1d}$, etc. The four photodiodes and the nine transistors are arraigned between first and second row lines and first and second column lines, referring to a region 'A' shown in FIG. 6. Thus, each unit pixel can be constituted with one photodiode and 2.25 transistors. As compared with the unit pixel shown in FIG. 5, the image sensor having 2×2 unit pixels shown in FIG. 6 is integrated more about two times; more particularly, the image sensor according to the present invention is more integrated than a conventional image sensor having three or four transistors.

A first unit pixel u/p1 coupled to the first row line and the first column line includes a first photodiode PDa, a first control transistor $T_{2a}$, a first transfer transistor $T_{1a}$, a first reset transistor $T_{3a}$, a first select transistor $T_{4a}$, and a first drive transistor $T_{5a}$.

A second unit pixel u/p2 coupled to the first row line and the second column line includes a second photodiode PDb, a second control transistor $T_{2b}$, a second transfer transistor $T_{1b}$, the first reset transistor $T_{3a}$, the first select transistor $T_{4a}$, and the first drive transistor $T_{5a}$.

Thus, the first unit pixel u/p1 and the second unit pixel u/p2 share the first reset transistor $T_{3a}$, the first select transistor $T_{4a}$, the first drive transistor $T_{5a}$, and a junction capacitor C1.

A third unit pixel u/p3 coupled to the second row line and the first column line includes a third photodiode PDc, the first control transistor $T_{2a}$, a third transfer transistor $T_{1c}$, a second reset transistor $T_{3b}$, a second select transistor $T_{4b}$, and a second drive transistor $T_{5b}$.

A fourth unit pixel u/p4 coupled to the second row line and the second column line includes a fourth photodiode PDd, the second control transistor $T_{2b}$, a fourth transfer transistor $T_{1d}$, the second reset transistor $T_{3b}$, the second select transistor $T_{4b}$, and the second drive transistor $T_{5b}$.

Thus, the third unit pixel u/p3 and the fourth unit pixel u/p4 share the second reset transistor $T_{3b}$, the second select transistor $T_{4b}$, the second drive transistor $T_{5b}$, and a junction capacitor C2.

In addition, the first unit pixel u/p1 and the third unit pixel u/p3 share the first control transistor $T_{2a}$; and the second unit pixel u/p2 and the fourth unit pixel u/p4 share the second control transistor $T_{2b}$.

As above described, the first unit pixel u/p1 and the second unit pixel u/p2 share the first reset transistor $T_{3a}$, the first select transistor $T_{4a}$, and the first drive transistor $T_{5a}$. Further, two unit pixels, not shown, corresponding to a neighbor row line share the first reset transistor $T_{3a}$, the first select transistor $T_{4a}$, and the first drive transistor T5a with the first unit pixel u/p1 and the second unit pixel u/p2. Thus, though the second reset transistor $T_{3b}$, the second select transistor $T_{4b}$, and the second drive transistor $T_{5b}$ included in the third and fourth unit pixels u/p3 and u/p4 are shared by other unit pixels located in an outside of the region 'A', four unit pixels u/p1 to u/p4 included in the region 'A' substantially includes nine transistors.

Moreover, the first and third unit pixels simultaneously output image data respectively because of sharing the first control transistor $T_{2a}$; and the second and fourth unit pixels simultaneously output image data respectively because of sharing the second control transistor $T_{2b}$.

In the other hand, the first and the third unit pixels coupled to a column line shares three transistors and a junction capacitor with the second and the fourth unit pixels coupled to another column line, respectively. For outputting image data from unit pixels, it is required that a shift system applies to unit pixels coupled to a predetermined column line and another unit pixels coupled to another column line for protecting a collision, wherein the predetermined column line and said another column line constitute a column line pair.

Therefore, in the image sensor shown in FIG. 6, unit pixels corresponding to an odd column line and an even column line are scanned twice for obtaining image data included in one frame.

Referring to FIG. 6, 2×2 unit pixels are arranged so that the unit pixel can share plural transistors with neighbor unit pixels; and, as a result, the number of transistors implemented for each unit pixel is 2.25.

Accordingly, the number of transistors implemented for each unit pixel is reduced to thereby make the unit pixel smaller. Also, in this case, a dynamic range can be increased effectively by above described method according to the present invention.

As above mentioned, the present invention can apply to an image sensor practically for broadening a dynamic range by controlling an integration time for each unit pixel because of following reasons.

First, since there is no additional frame memory for storing an integration time for each unit pixel in an outside of a pixel array block, a size of the whole image sensor can be reduced significantly.

Second, for obtaining a high quality image with a lower noise, the image sensor can be performed a true correlated double sampling (CDS) method.

Third, based on a lower noise, the image sensor can broaden a dynamic range of a dark area in the image.

Lastly, because of unit pixel sharing a transistor with neighbor unit pixels, the image sensor having a small unit pixel which is appropriate for a high resolution image sensor can be implemented.

As above described, the present invention can increase a dynamic range of a CMOS image sensor. Further, since the CMOS image sensor according to the present invention can embed a true correlated double sampling (CDS) method for reducing a random reset noise, a performance of the CMOS image sensor is dramatically improved. Moreover, a unit pixel included in the CMOS image sensor shares an element with neighbor unit pixels; as a result, the number of transistors per each pixel included in the CMOS image sensor is minimized.

The present application contains subject matter related to Korean patent application No. 2005-0006433, filed in the Korean Patent Office on Jan. 24, 2005, the entire contents of which being incorporated herein by reference.

While the present invention has been described with respect to the particular embodiments, it will be apparent to those skilled in the art that various changes and modification may be made without departing from the spirit and scope of the invention as defined in the following claims.

What is claimed is:

1. An apparatus for converting a real image into an electric signal, comprising:
   plural pixels, each for storing an integration time of a present frame that is estimated by the illumination of a prior frame; and
   control means for controlling the integration time of the present frame based on the stored integration time,
   wherein each pixel includes:
   a photodiode for receiving a light of a real image to generate a photo charge corresponding to the light;
   a transfer transistor for selectively transferring the photo charge;
   a junction capacitor for receiving the photo charge when the transfer transistor is turned on and, before receiving the photo charge, storing the integration time of the present frame;
   a reset transistor for receiving a first control signal having first and second predetermined voltage levels to reset the junction capacitor to the first predetermined voltage level or supply the second predetermined voltage level calculated based on the integration time to the junction capacitor in response to a reset signal;
   a drive transistor for outputting the electric signal corresponding to a charge amount transferred from the junction capacitor; and
   a select transistor for controlling a transmission of an electric signal outputted from the drive transistor.

2. The apparatus as recited in claim 1, wherein each pixel includes:
   a control transistor for controlling the transfer transistor.

3. The apparatus as recited in claim 2, wherein the plural pixels are arranged into a predetermined number of columns and the control means controls the plural pixels in a basis of column by column.

4. The apparatus as recited in claim 3, wherein the control transistor controls the transfer transistor by using a second control signal in response to a transfer signal which is inputted to a gate.

5. The apparatus as recited in claim 4, wherein the first and second control signals are generated by a column controller.

6. The apparatus as recited in claim 1, wherein the first predetermined voltage is a power source voltage.

7. The apparatus as recited in claim 1, wherein the select transistor coupled between a power source voltage and the drive transistor is turned on by a select signal.

8. An image sensor for converting a real image into an electric signal, comprising:
   a pixel array block including plural unit pixels, each for storing an integration time of a prior frame, wherein the plural unit pixels is arranged in a form of N by M matrix, N and M being positive integers; and
   a control block having plural column controllers, each for controlling an integration time of a present frame based on the stored integration time in a basis of column by column,
   wherein each pixel includes:
   a photodiode for receiving a light of a real image to generate a photo charge corresponding to the light;
   a transfer transistor for selectively transferring the photo charge;
   a junction capacitor for receiving the photo charge when the transfer transistor is turned on and, before receiving the photo charge, storing the integration time of the present frame;
   a reset transistor for receiving a first control signal having first and second predetermined voltage levels to reset the junction capacitor to the first predetermined voltage level or supply the second predetermined voltage level calculated based on the integration time to the junction capacitor in response to a reset signal;
   a drive transistor for outputting the electric signal corresponding to a charge amount transferred from the junction capacitor; and
   a select transistor for controlling a transmission of an electric signal outputted from the drive transistor.

9. The image sensor as recited in claim 8, wherein the control block includes:
   a first block for checking the integration time of the present frame based on the stored integration time in a basis of column by column to store the checked value to each unit pixel;
   a second block for receiving the checked value of the integration times which are respectively stored in other row lines of the present frame, in a basis of column by column, when an image corresponding to a first row line of the present frame is read out; and
   a third block for resetting each unit pixel based on the integration time of each pixel.

10. The image sensor as recited in claim 8, wherein each unit pixel includes:
    a control transistor for controlling the transfer transistor in response to a second control signal.

11. The image sensor as recited in claim 10, wherein the pixel array block includes a plurality of 2×2 neighbor unit pixels sharing a transistor, the 2×2 neighbor unit pixels respectively including a first to fourth unit pixels, each having the photodiode, the transfer transistor, the control transistor, the junction capacitor, the reset transistor, the drive transistor, and the select transistor.

12. The image sensor as recited in claim 10, wherein the first unit pixel and the second unit pixel share the control transistor, the junction capacitor, the reset transistor, the drive transistor, and the select transistor, the first and second unit pixels arranged in a same row line.

13. The image sensor as recited in claim 12, wherein the third unit pixel and the fourth unit pixel share the junction capacitor, the reset transistor, the drive transistor, and the select transistor, the third and fourth unit pixels arranged in a same row line.

14. The image sensor as recited in claim 13, wherein the first unit pixel and the third unit pixel share the control transistor, the first and third unit pixels arranged in a same column line.

15. The image sensor as recited in claim 14, wherein the second unit pixel and the fourth unit pixel share the control transistor, the second and fourth unit pixels arranged in a same column line.

16. A method for converting a real image into an electric signal, comprising:

storing integration times of a present frame, which is estimated by the illumination of a prior frame, to unit pixels respectively, wherein the unit pixels, each having a junction capacitor at a sensing node, are arranged in a form of N by M matrix, N and M being positive integers; and controlling the integration time of the present frame based on the stored integration time in a basis of column by column by resetting the junction capacitor to a first predetermined voltage level or supplying a second predetermined voltage level calculated based on the integration time to the junction capacitor in response to a reset signal.

17. The method as recited in claim 16, wherein the controlling the integration time includes:

checking the integration time of the present frame based on the stored integration time in a basis of column by column to store the checked value to each unit pixel;

receiving the checked value of the integration times which are respectively stored in other row lines of the present frame, in a basis of column by column, when an image corresponding to a first row line of the present frame is read out; and resetting each unit pixel based on the integration time of each pixel.

18. The method as recited in claim 17, wherein, during resetting each unit pixel, if the integration time stored in a predetermined unit pixel is over a predetermined time, a photodiode of the same unit pixel is reset; otherwise, the photodiode of the same unit pixel is not reset.

* * * * *

UNITED STATES PATENT AND TRADEMARK OFFICE
CERTIFICATE OF CORRECTION

| | | |
|---|---|---|
| PATENT NO. | : 7,619,674 B2 | Page 1 of 1 |
| APPLICATION NO. | : 11/337530 | |
| DATED | : November 17, 2009 | |
| INVENTOR(S) | : Han et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 894 days.

Signed and Sealed this

Twenty-sixth Day of October, 2010

David J. Kappos
*Director of the United States Patent and Trademark Office*